(12) United States Patent
Van Houten et al.

(10) Patent No.: US 12,179,875 B2
(45) Date of Patent: Dec. 31, 2024

(54) MICROMOBILITY ELECTRIC VEHICLE ERGONOMICS

(71) Applicant: Lyft, Inc., San Francisco, CA (US)

(72) Inventors: Lucas Jon Van Houten, San Francisco, CA (US); Conrad Xavier Murphy, San Francisco, CA (US); Nathalie Delsaer, San Francisco, CA (US); Mark Phillip Holveck, Sunnyvale, CA (US); Gregoire Ludovic Vincent Vandenbussche, San Francisco, CA (US); Andrew Michael Reimer, San Francisco, CA (US); Daniel Lami Goldstein, Berkeley, CA (US); Peter Rex Luedtke, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 349 days.

(21) Appl. No.: 17/025,594

(22) Filed: Sep. 18, 2020

(65) Prior Publication Data
US 2021/0086860 A1 Mar. 25, 2021

Related U.S. Application Data

(63) Continuation of application No. 16/579,556, filed on Sep. 23, 2019, now Pat. No. 10,780,938.

(51) Int. Cl.
*B62K 19/00* (2006.01)
*B62J 1/08* (2006.01)
(Continued)

(52) U.S. Cl.
CPC ............... *B62K 19/00* (2013.01); *B62J 1/08* (2013.01); *B62J 7/02* (2013.01); *B62J 11/00* (2013.01);
(Continued)

(58) Field of Classification Search
CPC ........ B62K 19/00; B62K 2202/00; B62J 1/08; B62J 7/02; B62J 11/00; B62J 99/00; B62J 45/20; B62L 1/00
See application file for complete search history.

(56) References Cited

U.S. PATENT DOCUMENTS

| 5,513,721 A | 5/1996 | Ogawa et al. |
| 5,647,450 A * | 7/1997 | Ogawa ................. H02J 7/0042 |
| | | 180/68.5 |

(Continued)

FOREIGN PATENT DOCUMENTS

| CN | 205 440 663 | 8/2016 |
| CN | 105818895 A | 8/2016 |

(Continued)

OTHER PUBLICATIONS

[No. Author Listed], And then there was Two, Bird Two, Bird Rides, Inc. 2019. 8 pages URL: https//two.bird.co [last accessed Sep. 26, 2019].

(Continued)

*Primary Examiner* — Bryan A Evans
(74) *Attorney, Agent, or Firm* — Baker Botts L.L.P.

(57) ABSTRACT

A micromobility vehicle for use in a vehicle share system includes a frame, a footboard fixed to the frame, a seat fixed to the frame, handlebars, and a computing device. The frame includes a horizontal portion and an angled portion. The seat is separated from the footboard in a vertical direction by a fixed distance. The handlebars are separated from the footboard in the vertical direction by a fixed distance. A cargo storage location is at least partially disposed between the seat and the footboard. The computing device is fixed to the frame and capable of executing a transportation matching system application.

15 Claims, 10 Drawing Sheets

(51) Int. Cl.
  *B62J 7/02* (2006.01)
  *B62J 11/00* (2020.01)
  *B62J 99/00* (2020.01)
  *B62L 1/00* (2006.01)
  *B62J 45/20* (2020.01)

(52) U.S. Cl.
  CPC ............. *B62J 99/00* (2013.01); *B62L 1/00* (2013.01); *B62J 45/20* (2020.02); *B62K 2202/00* (2013.01)

(56) References Cited

U.S. PATENT DOCUMENTS

| | | |
|---|---|---|
| 7,404,568 B1 | 7/2008 | Portelance |
| 7,898,439 B2 | 3/2011 | Bettez et al. |
| 8,706,336 B2 * | 4/2014 | Inui .................. B62J 43/16 180/218 |
| 9,076,136 B2 | 7/2015 | Bettez et al. |
| 9,269,236 B2 | 2/2016 | Bettez et al. |
| 9,598,128 B2 | 3/2017 | Assenat et al. |
| 10,245,937 B2 † | 4/2019 | Gillett |
| 2009/0240575 A1 | 9/2009 | Bettez et al. |
| 2010/0228405 A1* | 9/2010 | Morgal .................. B62H 3/00 701/1 |
| 2011/0161141 A1 | 6/2011 | Bettez et al. |
| 2015/0112478 A1 | 4/2015 | Bettez et al. |
| 2015/0152668 A1 | 6/2015 | Assenat et al. |
| 2017/0028972 A1 | 2/2017 | Kajiyama et al. |
| 2017/0036722 A1 | 2/2017 | Asenat et al. |
| 2017/0284433 A1* | 10/2017 | Thomas .................. B62J 9/21 |
| 2018/0319368 A1 | 11/2018 | Keating et al. |
| 2019/0127002 A1 | 5/2019 | Bettez et al. |
| 2019/0206009 A1 | 7/2019 | Gibson et al. |
| 2019/0248439 A1 | 8/2019 | Wang |

FOREIGN PATENT DOCUMENTS

| | | |
|---|---|---|
| CN | 106627921 A * | 5/2017 |
| CN | 208007215 U | 10/2018 |
| TW | M 579 417 | 6/2019 |
| WO | WO 2014/154295 | 10/2014 |
| WO | WO 2018/056819 | 3/2018 |

OTHER PUBLICATIONS

U.S. Appl. No. 16/391,294, filed Apr. 22, 2019, Bromwich et al.
U.S. Appl. No. 16/448,660, filed Jun. 21, 2019, Lambert et al.
U.S. Appl. No. 16/579,530, filed Sep. 23, 2019, Van Houten et al.
U.S. Appl. No. 16/578,995, filed Sep. 23, 2019, Vandenbussche et al.
U.S. Appl. No. 16/579,627, filed Sep. 23, 2019, Vandenbussche et al.
U.S. Appl. No. 29/706,673, filed Sep. 23, 2019, Van Houten et al.
U.S. Appl. No. 29/706,676, filed Sep. 23, 219, Van Houten et al.
U.S. Appl. No. 29/706,678, filed Sep. 23, 2019, Van Houten et al.
U.S. Appl. No. 29/706,682, filed Sep. 23, 2019, Can Houten et al.
International Search Report and Written Opinion, PCT/US2020/051665 dated Nov. 17, 2020, 17 pages.
International Search Report and Written Opinion, PCT/US2020/051666 dated Nov. 19, 2020, 17 pages.
CN OA received for Application No. 202080066814.9, 11 pages, Nov. 28, 2023.

\* cited by examiner
† cited by third party

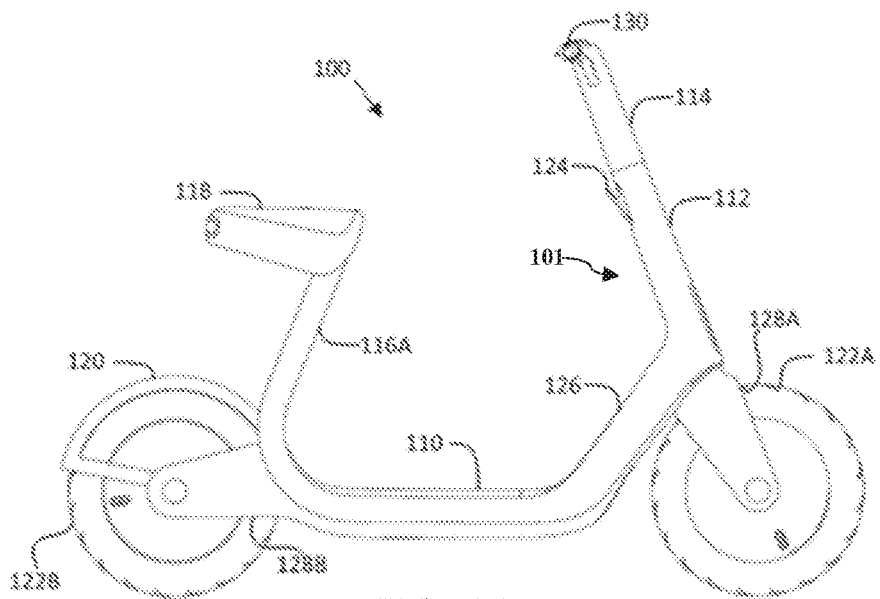
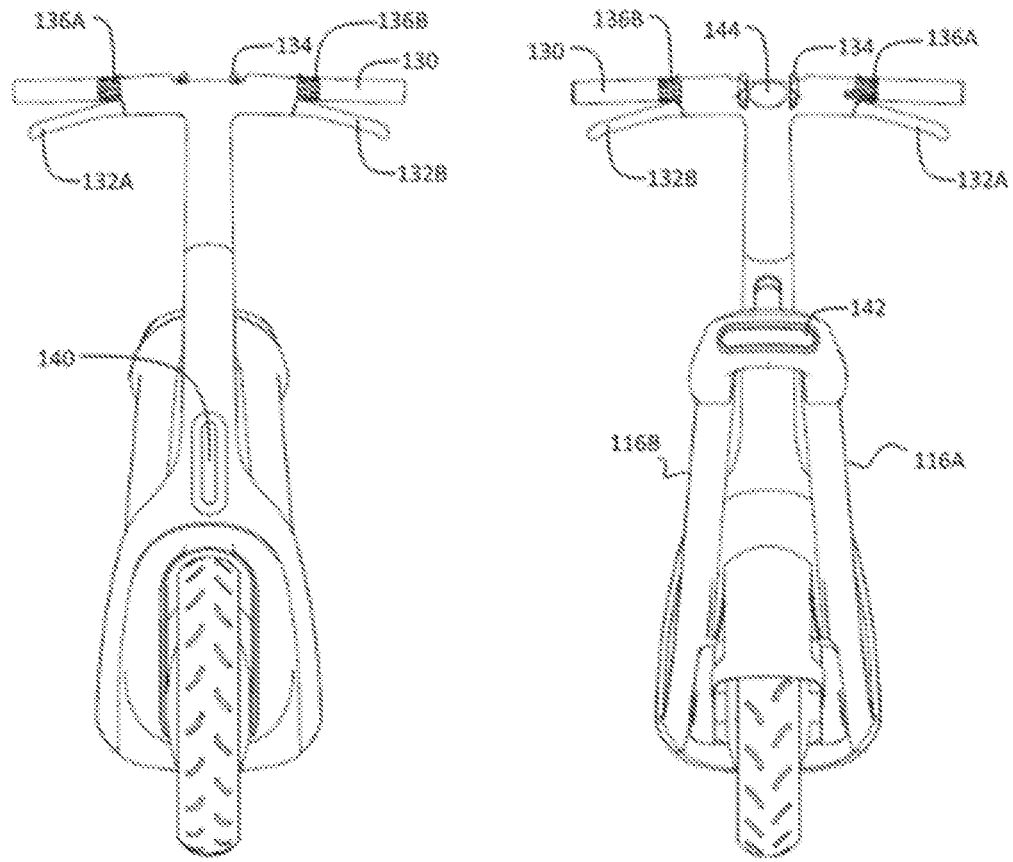
FIG. 1A
FIG. 1B  FIG. 1C

MICROMOBILITY ELECTRIC VEHICLE ERGONOMICS

CROSS-REFERENCE TO RELATED APPLICATIONS

This application is a continuation of U.S. patent application Ser. No. 16/579,556 filed Sep. 23, 2019 and issued as U.S. Pat. No. 10,780,938 on Sep. 22, 2020, which is hereby incorporated by reference in its entirety.

BACKGROUND

Conventional transportation options in urban environments include public transportation (e.g., subways, busses), large vehicles such as cars (e.g., personal vehicles, taxis, ride-share services), bicycles, and walking. More recently, shareable/rentable vehicles such as docked and dockless scooters and bicycles have become more common, improving access and allowing users additional options for traveling more quickly over shorter distances than walking typically allows.

SUMMARY

Having a variety of different transportation options improves users' lives by increasing mobility and enabling users to select the transportation option that works best for them on any given trip. For users desiring to travel relatively short distances (e.g., less than 5 miles), so-called "micromobility" transportation options provide convenient and environmentally-friendly alternatives to car-based travel. Micromobility transportation options include human-powered vehicles (e.g., bicycles, scooters) and vehicles with electric motors (e.g., electric bicycles, electric scooters), all of which are designed to be used primarily within the traditional bicycle lane infrastructure.

Within the micromobility transportation category, different transportation options may be more suitable for certain types of trips than others. For example, while a stand-up scooter may work well for short distances, a vehicle that allows the user to be seated (e.g., a bicycle) may work better for longer distances. Micromobility vehicles with electric motors such as electric bicycles and electric scooters prevent rider fatigue and assist with navigating hilly terrain. Additionally, the purpose of each trip may dictate which type of transportation option a user selects. For example, a daily commuter carrying nothing or only a small bag may select a transportation option that emphasizes speed over stability, whereas a user traveling to a store to pick up a package or groceries may select a transportation option emphasizing package storage and security rather than speed.

Most conventional micromobility transportation options are not well suited for moderate distance (e.g., 2-5 mile) trips, which are among the most common trips in an urban environment. For example, riding a bicycle or standing on a scooter and engaging a thumb accelerator for more than 1-2 miles may become tiresome for a user, and may result in the user not selecting those transportation options for such a trip. To this end, some embodiments are directed to an electric vehicle designed to accommodate such moderate distance trips across a variety of terrains to enhance the user's experience, comfort, and enjoyment while riding the vehicle.

In some embodiments, a universal micromobility vehicle configured for use in a vehicle share system comprises a frame, a footboard fixed to the frame, a seat fixed to the frame, and handlebars. The seat is separated from the footboard in a vertical direction by a fixed distance between 500 mm and 600 mm. The handlebars are separated from the footboard in the vertical direction by a fixed distance between 700 mm and 900 mm.

In some embodiments, a universal electric vehicle configured for use in a micromobility vehicle share system comprises a frame, a front wheel, a rear wheel, a steering column, handlebars, a footboard, and a seat. The frame comprises a column angled at an acute angle with respect to a horizontal direction. The front wheel and the rear wheel are separated in the horizontal direction, supported by the frame, and have lower surfaces configured to contact the ground. The steering column supported by the column. The handlebars are attached at a top of the steering column. The footboard is fixed to the frame at a fixed vertical distance relative to the lower surfaces of the front and rear wheels between 160 mm and 240 mm. The seat is fixed to the frame at a fixed vertical distance relative to the lower surfaces of the front and rear wheels between 700 mm and 800 mm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIG. 1A illustrates a side view of an electric vehicle in accordance with some embodiments;

FIG. 1B illustrates a front view of the electric vehicle of FIG. 1A;

FIG. 1C illustrates a rear view of the electric vehicle of FIG. 1A;

DETAILED DESCRIPTION

Figure 1D:
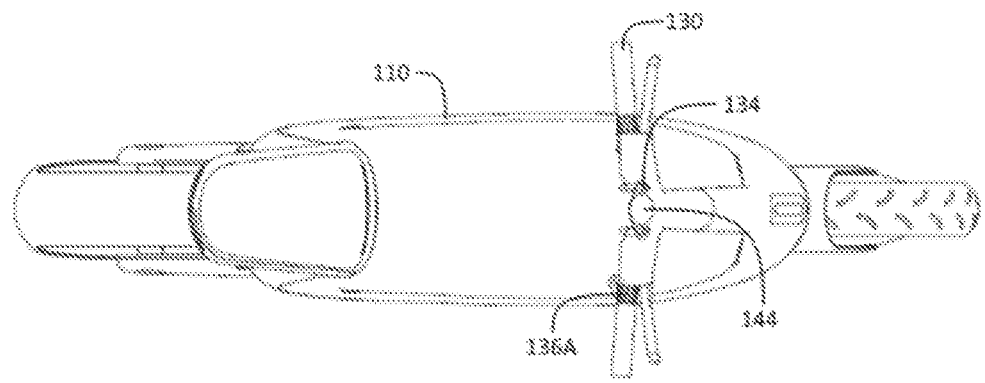
FIG. 1D illustrates a top view of the electric vehicle of FIG. 1A.
Figure 1E:
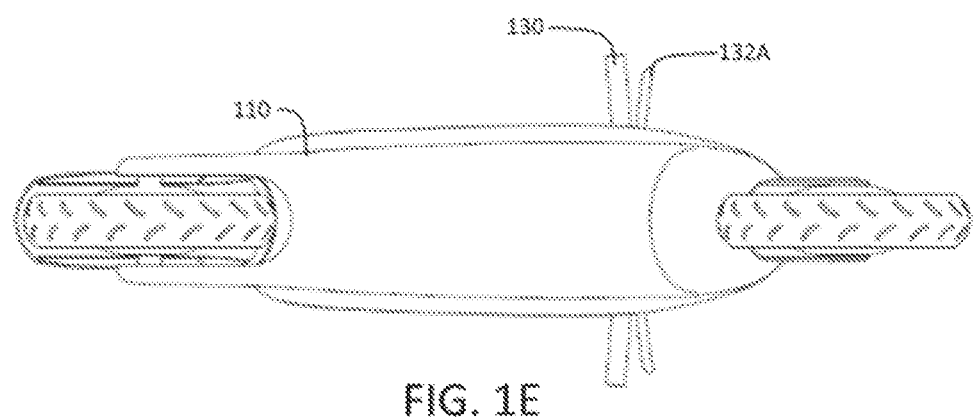
FIG. 1E illustrates a bottom view of the electric vehicle of FIG. 1A.

As discussed briefly above, most conventional micromobility transportation options are designed for short distance (e.g., 0-2 mile) trips, and are less comfortable for the user when used for moderate distance (e.g., 2-5 mile) trips. Some embodiments are directed to a micromobility electric vehicle and one or more features thereof that provide a safe, reliable, and approachable user experience for moderate distance trips. These electric vehicles may be accessible as part of a shared vehicle model in which riders do not have a personal vehicle, but instead interact with a dynamic matching system to access, under a rental or subscription model, any of numerous such electric vehicles deployed throughout a region, such as a city.

The inventors have appreciated that, by appropriate selection of certain dimensions of a micromobility vehicle, the vehicle may be designed without adjustable components and yet may still be usable by people with a wide range of physical characteristics. These designs may be implemented in an electric vehicle that is part of a vehicle share system, as it may be advantageous for a single electric vehicle to accommodate different users of different sizes.

A non-adjustable electric vehicle, providing a "one-size-fits-all" approach, may be simpler to use than an electric vehicle in which components are adjusted by riders before use of the vehicle to change dimensions, such as seat height or handlebar angle, for example. From the point of view of the user, a one-size-fits-all electric vehicle may be more approachable and less intimidating, as the user need not be concerned about adjusting components of the electric vehicle to match his/her body type. Ease of use may be enhanced with a one-size-fits-all electric vehicle compared to an adjustable electric vehicle in that a user may not need to make multiple changes or customizations to the settings of the electric vehicle before use. The reduced complexity of a one-size-fits-all electric vehicle may increase availability of vehicles, as fewer moving parts may enable more robust structures or structures that have less wear due to frequent readjustment. A one-size-fits-all electric vehicle may also provide benefits to an operator of a shared vehicle system, as such vehicles may be less expensive to manufacture and maintain, as there may be fewer parts overall, and fewer parts that move relative to one another.

A one-size-fits-all electric vehicle may, with appropriate selection of dimensions, adequately serve a population of users, by comfortably accommodating a large percentage of that population, such as greater than 90%, 95% or 98%, in various embodiments, for example. In this way, a universal vehicle may be produced and made available for that population. Appropriate dimensions will simultaneously satisfy multiple criteria for a large percentage of that population, such as fit, simplicity, reliability, approachability, and ease of use, as described above. Certain key combinations of dimensions may have particular bearing on universal applicability of a vehicle to provide user posture, comfort, safety, and overall experience.

Certain key dimensions of a universal electric vehicle may be of particular importance in order to best serve a target population of users. These key dimensions, both in isolation and in combination, may influence the body positions that a user adopts when using the one-size-fits-all electric vehicle. Some key dimensions may be particularly relevant to user body position while riding. For example, the distance between the seat and the footboard may affect the user's knee height, which may in turn affect user comfort. Similarly, some dimensions may be particularly relevant to user body position while stopped. For example, the distance between the handlebars and the ground may affect the user's shoulder position, which may in turn affect the ease with which a user may support the electric vehicle while stopped. Appropriate selection of these key dimensions may result in a vehicle that promotes riders to adopt good postures. Good rider posture may increase user comfort, safety, ease of maneuverability, and overall user experience. Some users near the edges of the target population (e.g., especially short users or especially tall users) may exhibit compensatory behaviors in order to better align their posture with the fixed dimensions of the electric vehicle.

Some of the key components of a one-size-fits-all electric vehicle that may influence key dimensions include the seat, the footboard, and the handlebars. The seat shape, angle, and height may affect user posture, ease of maneuvering, and sense of safety. The size, shape, and height of the footboard may affect the positions of the user's legs, pelvis, and back. Details of the handlebars may affect posture (especially the forward reach of the user's upper body and arms) and maneuverability.

FIGS. 1A-E illustrate a side view, a front view, a rear view, a top view, and a bottom view, respectively, of an electric vehicle 100 in accordance with some embodiments. In the illustrated embodiment, electric vehicle 100 is a two-wheeled vehicle with a front wheel 122A and a rear wheel 122B mounted on axles supported by fork 128A or 128B, respectively. Either or both of wheels 122A and 122B may be driven by an electric motor, which may have a stator mounted to one of the forks and a rotor coupled to the axle.

Batteries and control electronics may be mounted on board electric vehicle 100. In some embodiments, batteries and associated controllers may be mounted within a compartment coupled to a frame 101 of electric vehicle 100. For example, electric vehicle 100 includes a footboard 110. Footboard 110 may have upper and lower surfaces that are separate to create a compartment in which a battery and motor controller may be installed. The compartment may have one or more security features. For example, batteries may be removable, but may be locked in the compartment unless released by a key or special tool. Footboard 110 may have a flat portion arranged between the front wheel 122A and the rear wheel 122B and an angled portion 126. The angled portion 126 may be configured to accommodate storage and operate, at least in part, as a fender for the front wheel 122A so that a separate fender (e.g., fender 120 shown covering a portion of the rear wheel 122B) may not be required for the front wheel 122A.

Electric vehicle 100 includes a column 112 coupled to the angled portion 126 of the footboard 110 and a stem 114 rotatably coupled to the column 112. Stem 114 may have handlebars 130 at one end and may be attached at the other end to front fork 128A such that rotation of the handlebars 130 turns the fork 128A and front wheel 122A with it. Column 112 may include a channel to allow cabling (e.g., for brakes, a throttle, electronics, etc.) to be placed internal to the column.

Electric vehicle 100 also includes seat 118, which is coupled to footboard 110 by seat supports 116A and 116B.

Seat supports 116A, 116B curve upwards and forwards of the footboard 110. In some embodiments, a gap or open space exists between the seat supports 116A, 116B as shown in FIG. 1C. In some embodiments, footboard 110, column 112, and seat supports 116A and 116B may form a continuous frame that is not adjustable. For example, the frame may be formed of one continuous piece of material and/or may include multiple pieces of material that are welded, bolted or otherwise rigidly attached to prevent adjustment of the pieces relative to each other.

In some embodiments, the frame members may be tubular, with varying cross section. The cross section of the various frame members may be established based on functional as well as aesthetic considerations. For example, angled portion 126 may have a cross section that is elongated in a direction perpendicular to a surface on which wheels 122A, 122B rest. Such a configuration may provide a rim around portions of the footboard, creating a space along the angled portion 126 of the footboard for storage of items, and providing a finished and aesthetically pleasing appearance for electric vehicle 100, without separate body panels. Further, the rim may provide visual clues to riders how electric vehicle 100 can be used even when the rider needs to transport parcels, making the vehicle approachable.

Other features alternatively or additionally may be included on electric vehicle 100 to make the vehicle desirable for use on moderate distance trips. In some embodiments, column 112 may include a hook 124 configured to enable a loop, strap, or other portion of a personal item (e.g., a bag, backpack, package) to be secured to the vehicle. Collectively, the hook 124 and the angled portion 126 of the footboard may provide a storage area on the vehicle. Hook 124 may be adjustable such that it forms an angle relative to column 112 only when in use (e.g., when a bag is attached thereto) and retracts into column 112 when not in use.

As a further example of features that make electric vehicle 100 desirable for use on moderate distance trips, multiple user interface elements may be mounted to the upper end of stem 114, facing a user riding the vehicle. In the illustrated embodiment, stem 114 has attached thereto handlebars 130 configured to steer the vehicle by rotating the stem 114 relative to the column 112. Brake levers 132A and 132B are configured to are arranged proximate to handlebars 130 and are coupled to braking components located near the wheels 122A and/or 122B by brake cables located, for example, within column 112. Handlebars 130 also include throttle 136A and 136B configured to provide acceleration to the electric vehicle when engaged, for example, by rotating the throttle around an axis along the length of the handlebars 130. Although throttle 136A and 136B is shown as a rotatable component, in some embodiments, throttle 136A and 136B may additionally or alternatively include components that allow for control of the throttle without requiring rotation. For example, throttle 136A and/or 136B may include one or more thumb-based controls that enable manipulation of the throttle without requiring rotation. Additionally, throttle 136A and 136B may be arranged on both right and left handlebars 130 as shown, or alternatively, the throttle may be arranged on only one side of the handlebars 130 (e.g., only throttle 136A arranged on the right side handlebar may be present without a corresponding throttle 136B on the left side handlebar).

In some embodiments, handlebars 130 also include electronic device holder 134 configured to grasp a portable electronic device, such as a smartphone. In some embodiments, electronic device holder 134 comprises spring-loaded arms that retract, at least in part, into the handlebars 130 such that, when a portable electronic device is arranged between the spring-loaded arms, the electronic device holder 134 grips the device using forces (e.g., spring-based forces) applied by the spring-loaded arms against the edges of the device in the holder. While the electronic device holder 134 shown in FIGS. 1A-E are configured as horizontally positioned arms, in other embodiments they may be vertically oriented. In some embodiments, the orientation of electronic device holder 134 may be configurable, for example, by rotating the electronic device holder. A smartphone may thus be held such that its display is visible to the user of the electric vehicle 100 or such that sound output by its speakers is audible to the user.

A smartphone or other mobile device may be wirelessly coupled to control electronics of the electric vehicle 100, either through short range wireless communication (e.g., near field communication, Bluetooth, etc.) with control electronics on the vehicle 100 or through connection over a wide area network to a server exchanging information with control electronics on the vehicle 100. With such wireless coupling, the smartphone may provide a robust interface through which the user may provide or receive commands or information about the state of a vehicle during a trip. Further, the smartphone may have access to a cellular data network, GPS sensors and other sources of information, which can enable the user interface to display navigation or other information other than about the vehicle state per se that might be useful for a user. Such interfaces may be controlled by an app on the smartphone, enabling robust interfaces, which may be intuitive for a user to access and configure and/or can be provided along with guidance on configuring and accessing those user interfaces. In embodiments in which the electric vehicle is part of a vehicle sharing system in which vehicles are rented by users via a smartphone app, the app through which a user arranges for rental of a specific vehicle may control display of user interfaces associated with that vehicle, further making the vehicle accessible to users.

In some embodiments, a top surface of the stem 114 includes a display 144 arranged between the spring-loaded arms of the electronic device holder 134. The display 144 may be configured to display information about the electric vehicle 100. For example, display 144 may be configured to show a battery charge state of the vehicle 100, a predicted remaining range of the vehicle 100, maintenance information (e.g., tire pressure) related to the vehicle, a length of time that the vehicle has been operated, current charges associated with the operation of the vehicle when the vehicle is a shared vehicle, or any other suitable information. Display 144 may also be configured to show other information unrelated to the vehicle, but that the user may find useful during operation of the vehicle, such as time information and map or navigation information. When a portable electronic device (e.g., a smartphone) is secured by electronic device holder 134, display 144 may be at least partially hidden (e.g., in a top-view of the vehicle 100) by the electronic device due to the relative arrangement of electronic device secured by the electronic device holder 134 and the display 144. In such an instance, the display of the electronic device may present the same, different, or additional information that the display 144 is configured to present. In some embodiments, the display of the electronic device may be configured to present, e.g., via an app on the device, additional information to provide an enhanced user experience during operation of the vehicle. Additionally, the display 144 may be turned off or dimmed when an electronic device is secured in electronic device holder 134 to save power.

Electric vehicle 100 further includes lights 140 and 142 arranged on the front and rear of the vehicle. Front light 140 may be configured, at least in part, as a headlight for providing illumination of the roadway and to signal the presence of the vehicle to oncoming vehicular and non-vehicular traffic. Rear light 142 may be configured, at least in part, as a brake light to indicate to others behind the vehicle when the user of the vehicle has applied the brakes. Rear light 142 may also include one or more indicators for turn signals when the electric vehicle is configured to use turn signal indicators. In some embodiments, lights 140 and 142 are configured to display information about the vehicle, for example, when the user approaches the vehicle and/or starts the vehicle. For example, one or both of the lights may turn on and/or flash in a predetermined sequence upon starting the vehicle. Additionally, although shown as single lights 140 and 142 located on the front and rear of the vehicle respectively, it should be appreciated that each light assembly may include multiple lights having different characteristics (e.g., colors) and may be controlled independently or together.

In some embodiments, a universal micromobility vehicle is designed to accommodate 98% of the population. That vehicle may be an electric vehicle with fixed positions of certain components. Fixed positions may be established in some embodiments by attaching components to frame 101 without adjustable components. A fixed attachment, may be achieved, for example, by integrally forming components or using screws, clamps or other attachment mechanisms. In the example of FIGS. 1A-1E, footboard 110 and seat 118 are fixed to frame 101. It should be appreciated that components that are fixed in a position may be removable, such as for replacement or to access a compartment or space blocked by the component, even though those components are not adjusted by users in operation.

As a result of fixing components to the frame or otherwise integrating components into the electric vehicle without components designed to provide adjustability in use, distances between the components may also be fixed. For example, a distance between the seat and the footboard may be fixed. In embodiments in which stem 114 is not adjustable, a distance between the handlebars and the footboard or between the handlebars and ground may also be fixed, as may be the distance between the handlebars and the seat. A distance between the front wheel and the rear wheel may also be fixed.

Figure 2A:
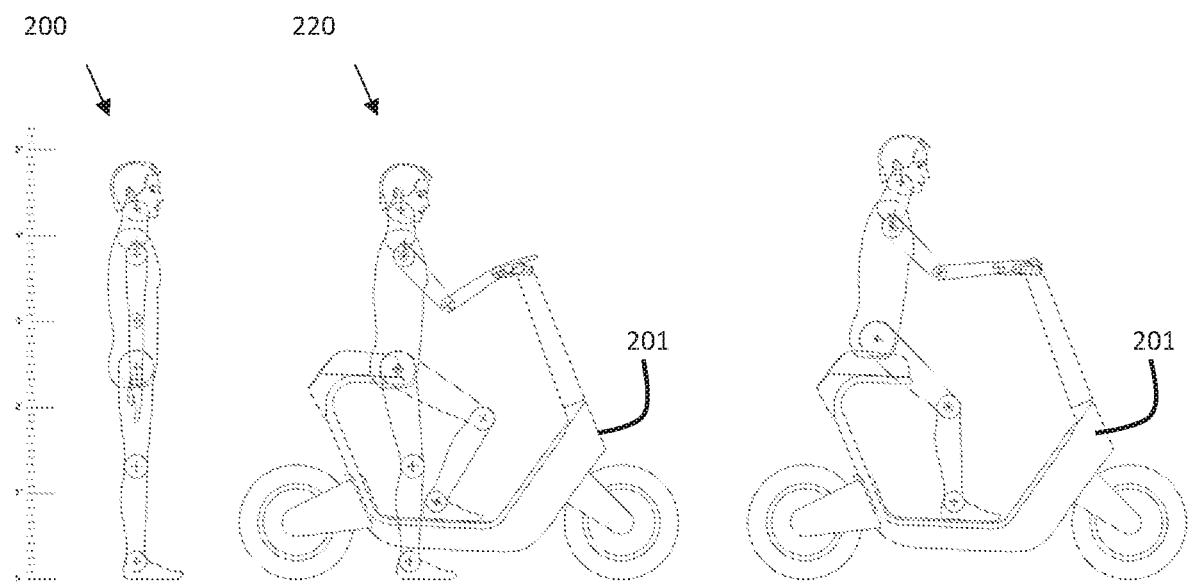
FIG. 2A illustrates a $1^{st}$ height percentile woman on an electric vehicle in accordance with some embodiments.
Figure 2B:
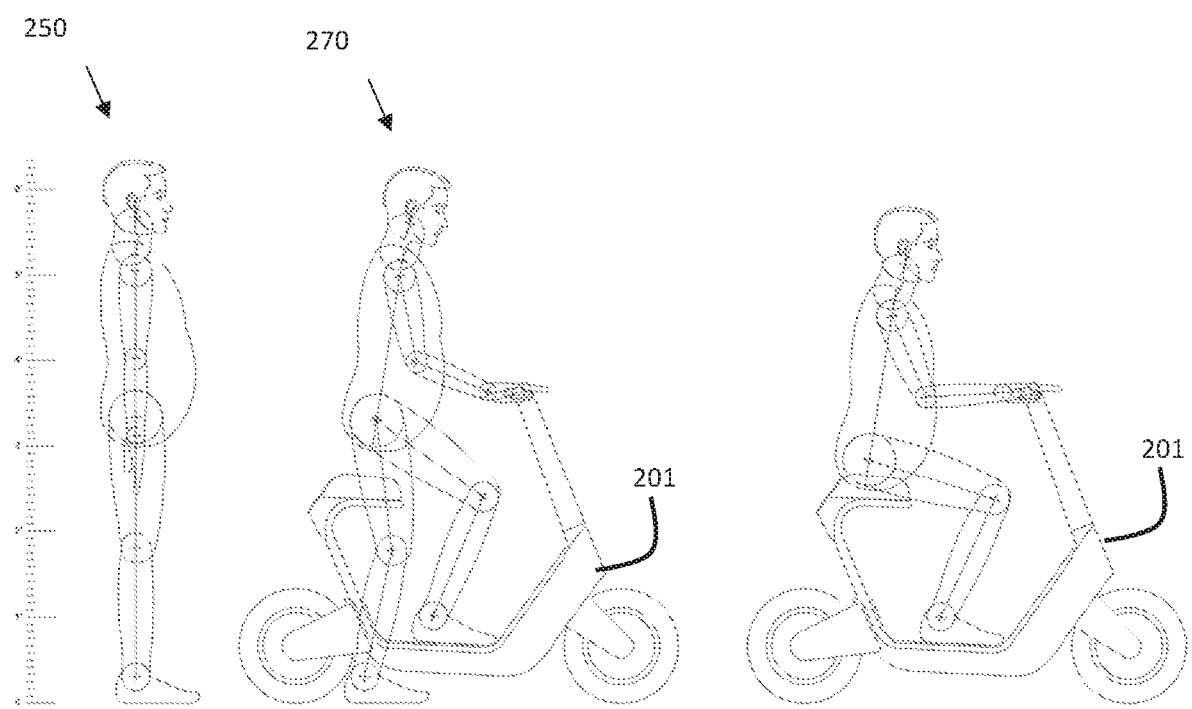
FIG. 2B illustrates a 99th height percentile man on an electric vehicle in accordance with some embodiments.

In some embodiments, the electric vehicle can be operated by a user whose height ranges from that of a 1st height percentile woman to that of a 99th height percentile man, according to population models in the US. FIG. 2A illustrates a 1st height percentile woman 200 on an electric vehicle in accordance with some embodiments, while FIG. 2B illustrates a 99th height percentile man on an electric vehicle in accordance with some embodiments. In the illustrated embodiment, distances between various parts of the electric vehicle are fixed and non-adjustable. Users who are short or tall relative to the average person in the target population may operate the vehicle differently than average-sized users in the target population. Dimensions may be selected to accommodate average-sized riders as well as shorter and taller riders, taking into consideration compensatory behavior of shorter or taller riders.

A 1st height percentile woman 200 may have a height of 4 feet 10 inches. Such shorter users may be expected to operate the electric vehicle in a mid-sitting to standing position, as illustrated by a 1st height percentile woman 220 riding a one-size-fits-all vehicle 201. An expected posture while stopped is illustrated by a 1st height percentile woman stopped 220. A shorter user may be expected to operate the electric vehicle with hips, knees, and ankles in a more open position. A 99th height percentile man 250 may have a height of 6 feet 3½ inches. Such taller users may be expected to operate the electric vehicle 201 in a standard sitting position, as illustrated by a 99th height percentile man 270 riding electric vehicle 201. An expected posture while stopped is illustrated by a 99th height percentile man stopped 270. A taller user may be expected to operate the electric vehicle with hips, knees, and ankles in a more bent position.

Figure 3A:
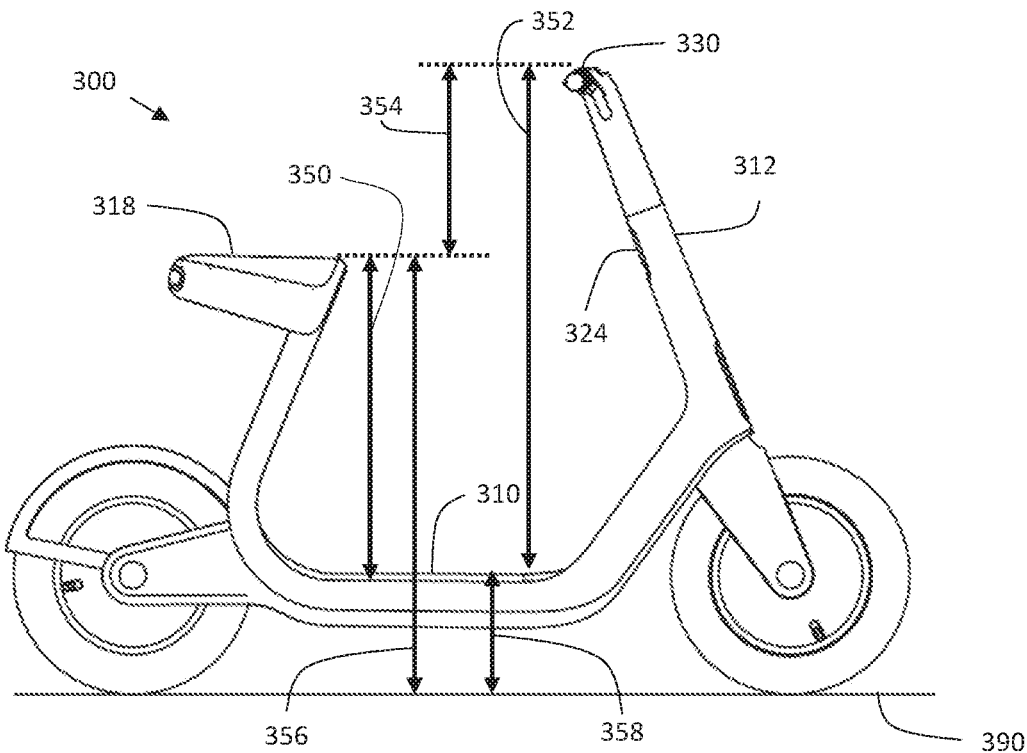
FIG. 3A illustrates dimensions of an electric vehicle in accordance with some embodiments.
Figure 3B:
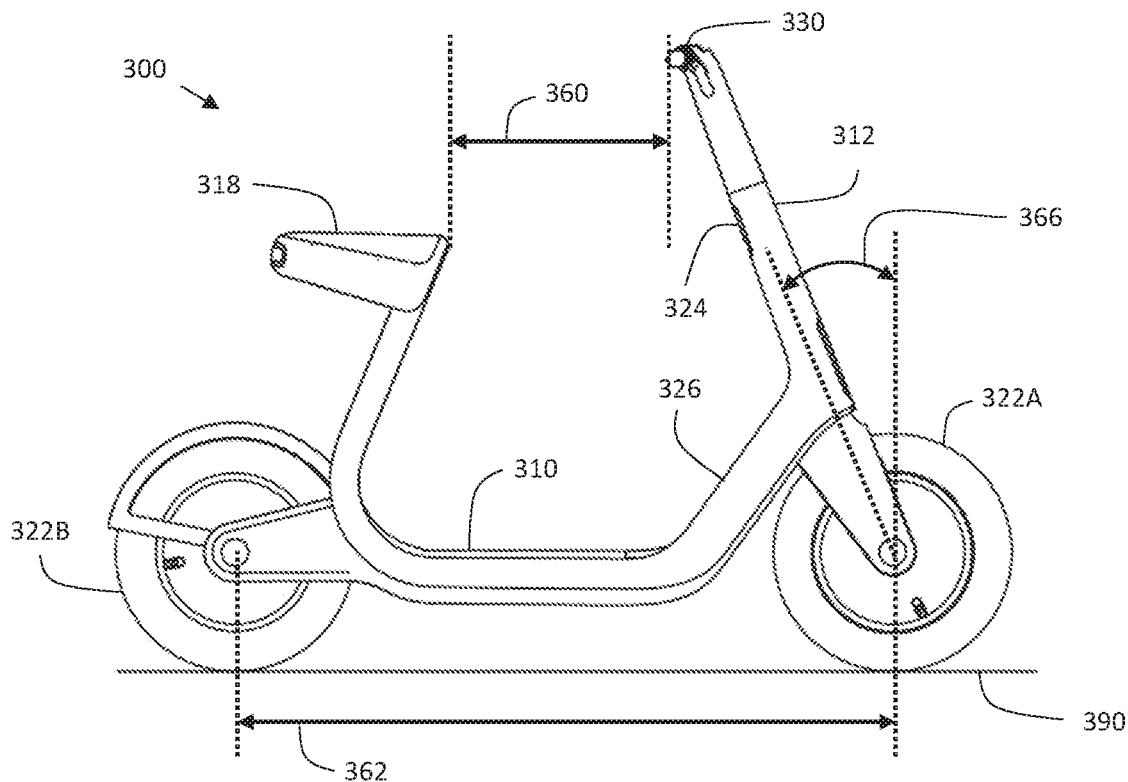
FIG. 3B illustrates additional dimensions of the electric vehicle of FIG. 2A.

FIGS. 3A-B illustrate dimensions of an electric vehicle 300 in accordance with some embodiments. FIG. 3A illustrates distances measured in a vertical direction. FIG. 3B illustrates dimensions measured in a horizontal direction. The distances between various components of the electric vehicle may affect a user's posture and comfort while operating the electric vehicle. As a result the position of certain components of an electric vehicle 300 may be of particular importance with regard to user posture. Such components include footboard 310, seat 318, and handlebars 330. Other components, such as column 312 and hook 324 are also illustrated. It should be understood that other components may be relevant to user posture and comfort, and the disclosure is not limited in this regard. Dimensions between these and other components may influence user posture both while riding the electric vehicle and while stopped.

Certain dimensions may be particularly relevant to a user's experience while riding an electric vehicle 300. Dimensions relevant to user posture and comfort during riding include the vertical seat-to-footboard distance 350, the vertical handlebar-to-footboard distance 352, the vertical handlebar-to-seat distance 354, and the horizontal handlebar-to-seat distance 360. The angle of the seat 318 relative to the floorboard 310 may similarly affect user posture, comfort, safety, and overall experience.

In some embodiments, the top of the seat 318 may be angled with respect to the ground 390. In some embodiments, the seat is angled with respect to the ground at an angle between 1 degree and 5 degrees. In some embodiments, the seat is angled with respect to the ground at an angle between 2 degrees and 3 degrees. In some embodiments, the footboard 310 may be angled with respect to the ground 390. In some such embodiments, the angle of the footboard may match the angle of the top of the seat so that the footboard and the top of the seat are substantially parallel. In other embodiments, the angle of the footboard may differ from the angle of the top of the seat.

Figure 4A:
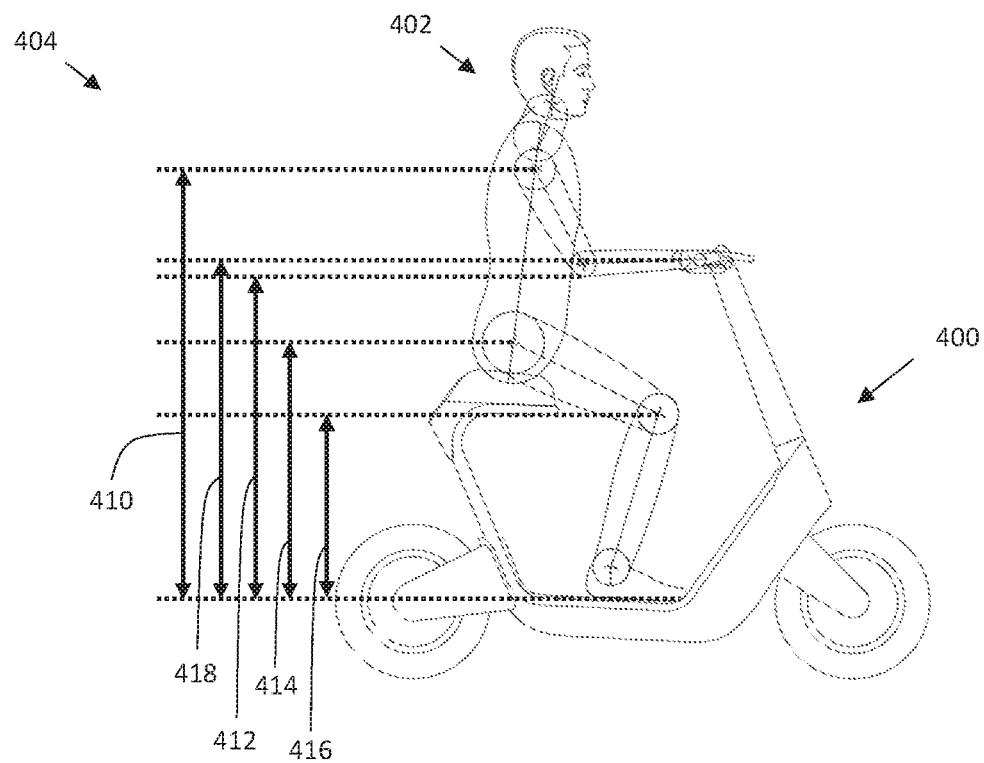
FIG. 4A illustrates a user's riding posture on an electric vehicle.
Figure 4B:
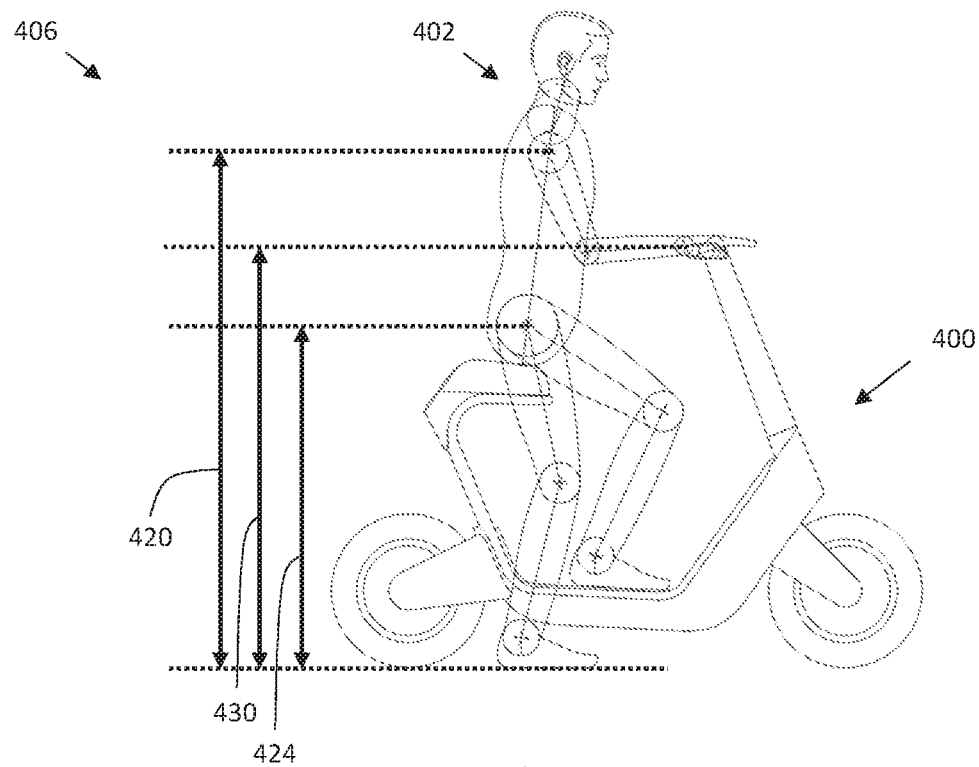
FIG. 4B illustrates a user's stopped posture on an electric vehicle.

FIGS. 4A-B illustrate a riding posture 404 and a stopped posture 406, respectively, of a user 402 on an electric vehicle 400. A user's posture may determine the level of comfort and enjoyment derived while operating the electric vehicle. Good posture may be related to better performance, better tolerance to riding, and an overall more enjoyable experience.

Referring to FIG. 4A, a good posture while riding 404 may be identified by a number of characteristics. For example, a good riding posture may be described as a posture in which a user 402 is generally upright, with the user's feet resting on the footboard. The user's riding hip height 414 may be higher than the user's riding knee height 416. The handlebar may be located at a handlebar-to-footboard height 418 between the user's riding shoulder height 410 and the user's riding elbow height 412. The user's wrists and knees may be aligned vertically. Other indications of good riding posture may include a forward lean of the trunk of up to 30 degrees, maintenance of the spinal curves, weight bearing on the footboard and seat, hip extension of 100 degrees to 135 degrees, knee flexion of 90 degrees to 135 degrees, ankle angles of 70 degrees to 120 degrees, head and neck flexion of 0 degrees to 30 degrees, relaxed shoulders, shoulder flexion of 10 degrees to 70 degrees, upper arm abduction of 10 degrees to 50 degrees, elbow extension of 100 degrees to 170 degrees, and wrist extension of 0 degrees to 45 degrees. Of course, not all of these characteristics and/or indications of good posture may be met simultaneously while riding. Furthermore, other additional characteristics may be more or less relevant in different situations. For example, a user may be expected to lean forward while riding uphill, or lean backwards while riding downhill. In such cases, the user's body position may fall outside of the above ranges indicative of good riding posture, and yet such postures may still be appropriate. As such, the above ranges are for purpose of example only, and the disclosure is not limited in this regard.

Referring to FIG. 4B, a good posture while stopped 406 may be similarly identified by a number of characteristics. For example, a good stopped posture may be described as a posture in which a user is generally upright. Ideally, both of the user's feet may reach the ground from a seated position. For shorter users, at least one foot may reach the ground while the user is still contacting the seat. The handlebar may be located at a handlebar-to-ground height 430 between the user's stopped shoulder height 420 and the user's stopped hip height 424. Other indications of good stopped posture may include a forward lean of the trunk of up to 20 degrees, maintenance of the spinal curves, weight bearing on the seat and ground, hip extension of 100 degrees to 180 degrees, knee extension of 100 degrees to 180 degrees, ankle extension of 70 degrees to 160 degrees, head and neck flexion of 0 degrees to 30 degrees, relaxed shoulders, shoulder flexion of 10 degrees to 50 degrees, elbow extension of 100 degrees to 170 degrees, and wrist extension of 0 degrees to 30 degrees. Of course, not all of these characteristics and/or indications of good posture may be met simultaneously while stopped. Furthermore, other additional characteristics may be more or less relevant in different situations. As such, the above ranges are for purpose of example only, and the disclosure is not limited in this regard.

Figure 5A:
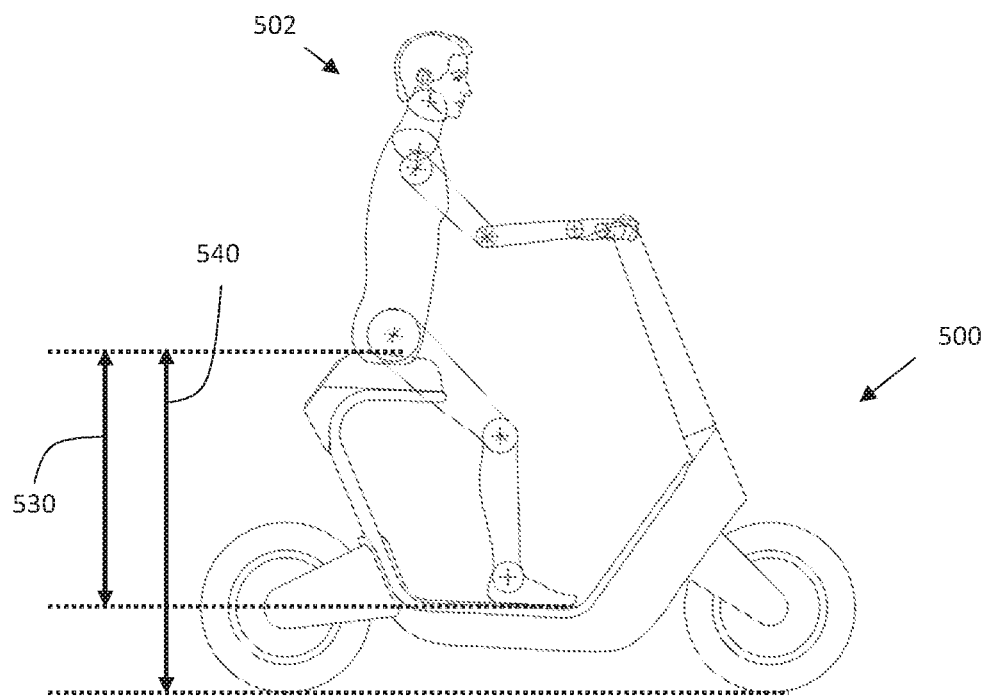
FIG. 5A illustrates a riding posture of a $1^{st}$ height percentile woman on an electric vehicle.
Figure 5B:
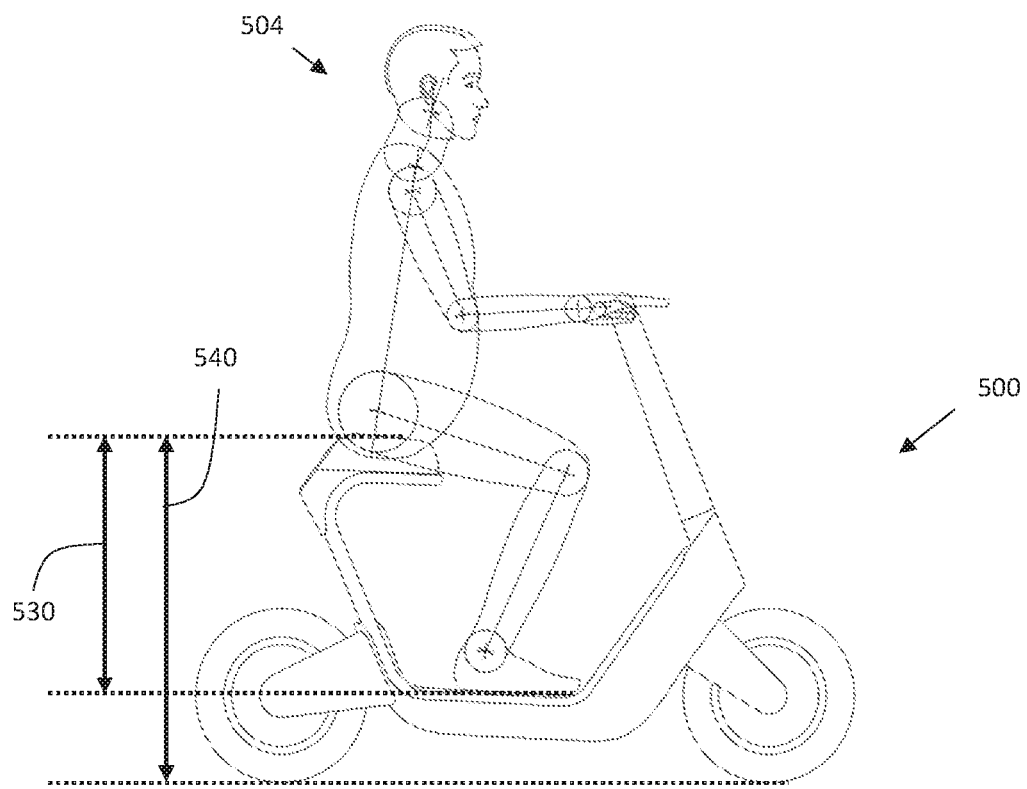
FIG. 5B illustrates a 99th height percentile man's riding posture on an electric vehicle.

FIGS. 5A-B illustrate the effect of seat height on riding posture for different users. FIG. 5A illustrates a riding posture of a 1st height percentile woman 502 on an electric vehicle 500. FIG. 5B illustrates a riding posture of a 99th height percentile man 504 on an electric vehicle 500. These drawings show the effect of seat height on posture while riding for different users. The seat-to-footboard distance 530 may at least partially dictate the positions of a user's legs and feet, which may in turn affect overall posture and comfort. The seat-to-ground distance 540 becomes relevant in determining whether a user can reach the ground with both feet or just a single foot when stopped or performing slow turns. Ideally, the seat-to-ground distance would be greater than a tall user's popliteal height and less than a short user's crotch height.

With a one-size-fits-all electric vehicle, shorter users may perform compensatory behavior to compensate for a seat height that may be higher than a seat height designed for shorter users. For example, when stopping, shorter users may reach the ground by flexing their ankles and extending their toes, rather than reaching the ground with a flat foot. Additionally, shorter users may lean the vehicle to a side, slide off of the seat sideways, and/or stand completely off of the seat.

Figure 6A:
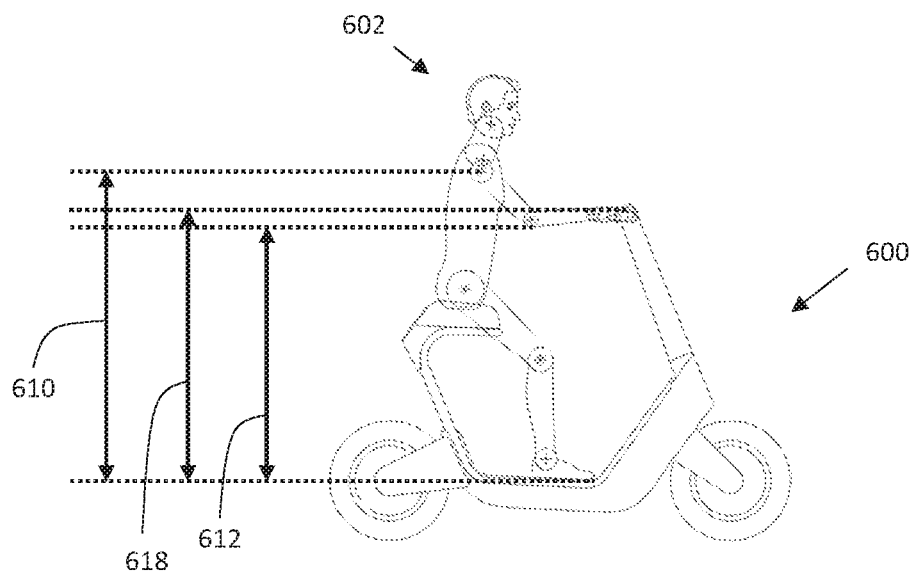
FIG. 6A illustrates a 1st height percentile woman's elbow height and shoulder height while in a riding posture.
Figure 6B:
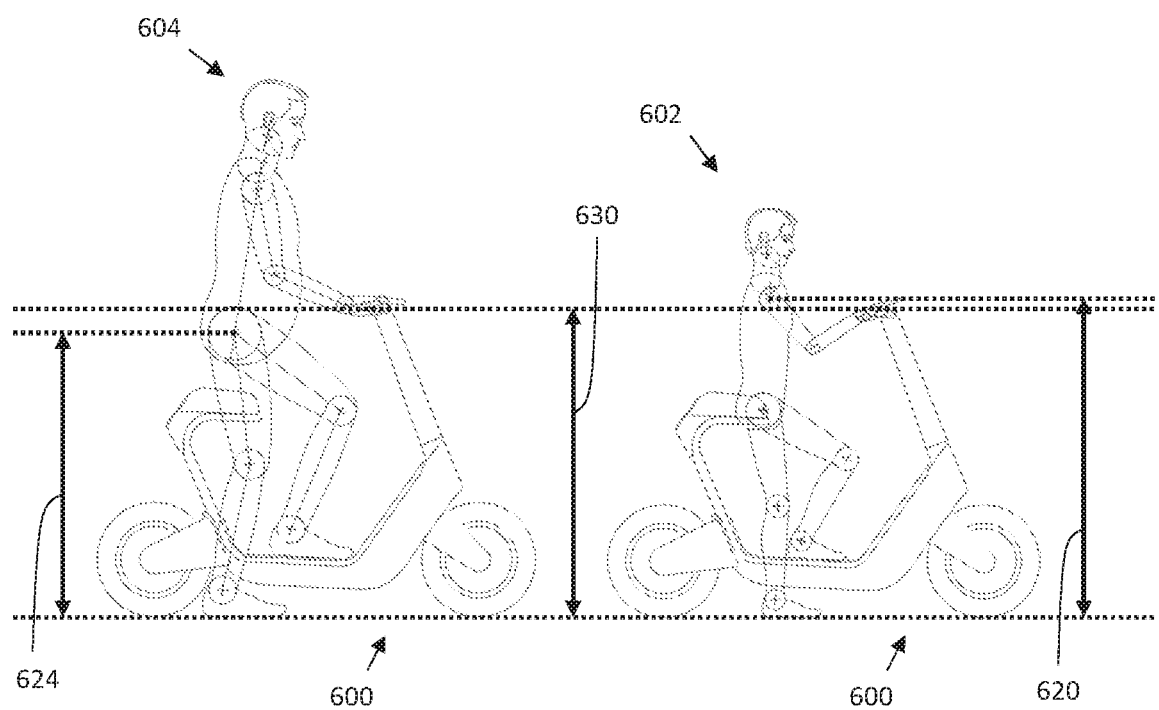
FIG. 6B illustrates a 1st height percentile woman's shoulder height while and a 99th height percentile man's hip height while in a stopped posture.

FIGS. 6A-B illustrate the effect of handlebar height of an electric vehicle 600 on riding posture for a given user, and on stopped postures for different users. FIG. 6A illustrates elbow height 612 and shoulder height 610 of a 1st height percentile woman 602 while in a riding posture, while FIG. 6B illustrates a 1st height percentile woman's shoulder height 620 and a 99th height percentile man's hip height 624 while in a stopped posture. These drawings show the effect of handlebar height on a user's posture both while riding and stopped. It may be desirable for the handlebar-to-footboard height 618 to be below a 1st height percentile woman's riding shoulder height 610. At the same time, it may be desirable for the handlebar height to be above a 99th height percentile man's riding elbow height. While stopped, the handlebar-to-ground height 630 may be below a 1st height percentile woman's stopped shoulder height 620 and above a 99th height percentile man's stopped hip height 624.

In some embodiments, the column 312 of the electric vehicle 300 may be angled with respect to the vertical axis to maintain horizontal separation between the handlebars and the seat in the range described above, while creating a cargo storage location above the footboard. Column 312 may be angled, for example, at an acute angle 366 with respect to the vertical. Such a configuration may create a large storage area between the seat and the column, while providing a comfortable ride for riders in the population of likely users. In some embodiments, the acute angle 366 is between 10 degrees and 30 degrees. In some such embodiments, the acute angle is between 15 degrees and 25 degrees.

One or more components of the vehicle may define the storage area, which may be adjacent the base of the column. For example, column 312 may include a hook 324 configured to hold a personal item. Alternatively or additionally, the angled portion 326 of the footboard may be bounded on at least two sides by a lip to provide a storage area on the electric vehicle 300. That storage area may be large enough to hold a small parcel that a rider might be carrying. In some embodiments, hook 324 and/or angled portion 326 may be shaped and positioned such that a bag or other cargo hanging on hook 324 or resting on the footboard in the storage area may be easily accessible to a rider sitting on electric vehicle 300 with good posture.

The acute angle 366 of column 312 may enable a relatively large storage area, such as on the order of one cubic foot or greater. Such a storage area may create a relatively large horizontal separation between the seat and the base of the column 312. The horizontal separation of the handlebars, at the top of the column, may be less, and may be within the ranges described herein as promoting good posture for riders in a population of likely riders of the vehicle.

In some embodiments, an electric vehicle includes a braking system. In some embodiments, a braking system may be integrated into a front fork of an electric vehicle, such as the front fork 128A of electric vehicle 100 shown in FIGS. 1A-E. In such embodiments, the electric vehicle may comprise a front wheel, a fork supporting the front wheel, and a brake pad aligned with a portion of the wheel. The brake pad may be actuated by an actuator housed within the fork, such that actuating the actuator causes the brake pad to press into a portion of the wheel. The actuator may be a piston, although other actuators are contemplated and the disclosure is not limited in this regard. In some embodiments, brake pads may be recessed into the fork such that they are not visible from the forward view, as illustrated, for example, in FIG. 1B.

In some embodiments, some or all of the components of an electric vehicle may be angled or uneven. In such embodiments, the height of the seat 318 should be measured at the most forward point of the seat. The height of the footboard 310 should be the average height along the entire length of the footboard, excluding the angled portion 326 of the footboard. Correspondingly, the vertical seat-to-footboard distance 350 should be measured from the most forward point of the seat 318 to the average height of the footboard 310.

Specific ranges of values of the vertical seat-to-footboard distance 350 may be particularly advantageous in providing a universal vehicle that can be used by a sufficiently large portion of a population that one design may be made available, such as in a vehicle sharing system, for all members of the population. In some embodiments, the vertical seat-to-footboard distance 350 is between 500 mm and 600 mm. In some embodiments, the vertical seat-to-footboard distance 350 is between 530 mm and 580 mm. In some embodiments, the vertical seat-to-footboard distance 350 is between 540 mm and 560 mm.

Specific ranges of values of the vertical handlebar-to-footboard distance 352 may be particularly advantageous. In some embodiments, the vertical handlebar-to-footboard distance 352 is between 700 mm and 900 mm. In some embodiments, the vertical handlebar-to-footboard distance 352 is between 760 mm and 860 mm. In some embodiments, the vertical handlebar-to-footboard distance 352 is between 790 mm and 810 mm.

Specific ranges of values of the horizontal handlebar-to-seat distance 360 may be particularly advantageous. In some embodiments, the horizontal handlebar-to-seat distance 360 is between 300 mm and 430 mm. In some embodiments, the horizontal handlebar-to-seat distance 360 is between 330 mm and 400 mm. In some embodiments, the horizontal handlebar-to-seat distance 360 is between 360 mm and 370 mm.

Specific ranges of values of the vertical handlebar-to-seat distance 354 may be particularly advantageous. In some embodiments, the vertical handlebar-to-seat distance 354 is between 240 mm and 280 mm.

In addition to specific ranges of values of certain dimensions in isolation, the inventors have appreciated that combinations of specific ranges of values of certain dimensions are particularly advantageous. In some embodiments, the vertical seat-to-footboard distance 350 is between 500 mm and 600 mm and the vertical handlebar-to-footboard distance 352 is between 700 mm and 900 mm. In some embodiments, the vertical seat-to-footboard distance 350 is between 530 mm and 580 mm and the vertical handlebar-to-footboard distance 352 is between 760 mm and 860 mm. In some embodiments, the vertical seat-to-footboard distance 350 is between 540 mm and 560 mm and the vertical handlebar-to-footboard distance 352 is between 790 mm and 810 mm.

Furthermore, specific ratios of values of certain dimensions may be particularly advantageous. In some embodiments, the vertical handlebar-to-footboard distance 352 is at least 20% greater than the vertical seat-to-footboard distance 350, and the vertical handlebar-to-footboard distance 352 is at most 80% greater than the vertical seat-to-footboard distance 350. In some embodiments, the vertical handlebar-to-footboard distance 352 is at least 40% greater than the vertical seat-to-footboard distance 350, and the vertical handlebar-to-footboard distance 352 is at most 60% greater than the vertical seat-to-footboard distance 350.

Certain dimensions may be particularly relevant to a user's experience while stopped on an electric vehicle 300. Generally, the distances between various components of the electric vehicle and the ground 390 may become more relevant when a user is stopped as compared to when a user is riding. Dimensions relevant to user posture and comfort while stopped include the vertical seat-to-ground distance 356 and the vertical footboard-to-ground distance 358. It should be understood that other dimensions may be relevant to user posture and comfort while stopped, and the disclosure is not limited in this regard.

Specific ranges of values of the vertical seat-to-ground distance 356 may be particularly advantageous. In some embodiments, the vertical seat-to-ground distance 356 is between 700 mm and 800 mm. In some embodiments, the vertical seat-to-ground distance 356 is between 720 mm and 780 mm. In some embodiments, the vertical seat-to-ground distance 356 is between 740 mm and 760 mm.

Specific ranges of values of the vertical footboard-to-ground distance 358 may be particularly advantageous. In some embodiments, the vertical footboard-to-ground distance 358 is between 160 mm and 240 mm. In some embodiments, the vertical footboard-to-ground distance 358 is between 180 mm and 220 mm. In some embodiments, the vertical footboard-to-ground distance 358 is between 190 mm and 210 mm.

In addition to specific ranges of values of certain dimensions in isolation, combinations of specific ranges of values of certain dimensions may be particularly advantageous. Dimensions providing appropriate posture for a user while riding and dimensions that enable a desirable user experience while stopped may be provided in the same vehicle. In some embodiments, for example, the seat-to-ground distance 356 is between 700 mm and 800 mm and the footboard-to-ground distance 358 is between 160 mm and 240 mm. In some embodiments, the seat-to-ground distance 356 is between 720 mm and 780 mm and the footboard-to-ground distance 358 is between 180 mm and 220 mm. In some embodiments, the seat-to-ground distance 356 is between 740 mm and 760 mm and the footboard-to-ground distance 358 is between 190 mm and 210 mm.

Other dimensions not specified above may also be important. The wheel-to-wheel distance 362 is the distance between the center of the front wheel 322A and the center of the rear wheel 322B. Here, wheels 332A and 332B are supported by the frame, via a rotatable coupling, such as an axle passing through a bearing attached to the frame. Though the wheels are rotatable, their horizontal and vertical positions may be fixed by such an attachment. In some embodiments, the wheel-to-wheel distance 362 is between 1000 mm and 1300 mm. In some embodiments, the wheel-to-wheel distance 362 is between 1100 mm and 1200 mm.

It should be understood that other dimensions may be relevant to posture, comfort, safety, and overall experience during riding, and the disclosure is not limited in this regard. It should be appreciated that although certain components, dimensions, and combinations of dimensions are discussed herein, other components, dimensions, and combinations of dimensions may additionally be relevant to the subject matter of this disclosure. Furthermore, some dimensions described herein may be fully defined based on previously defined dimensions and/or may be derived from those dimensions. For instance, the distance from a first component to a third component in one direction may be fully defined given the distances along that direction from the first component to a second component and from the second component to the third component. In these instances, it should be appreciated that no relative importance of the various dimensions should be inferred. Rather, some orders of describing dimensions may simply be more natural for particular examples.

Figure 7:
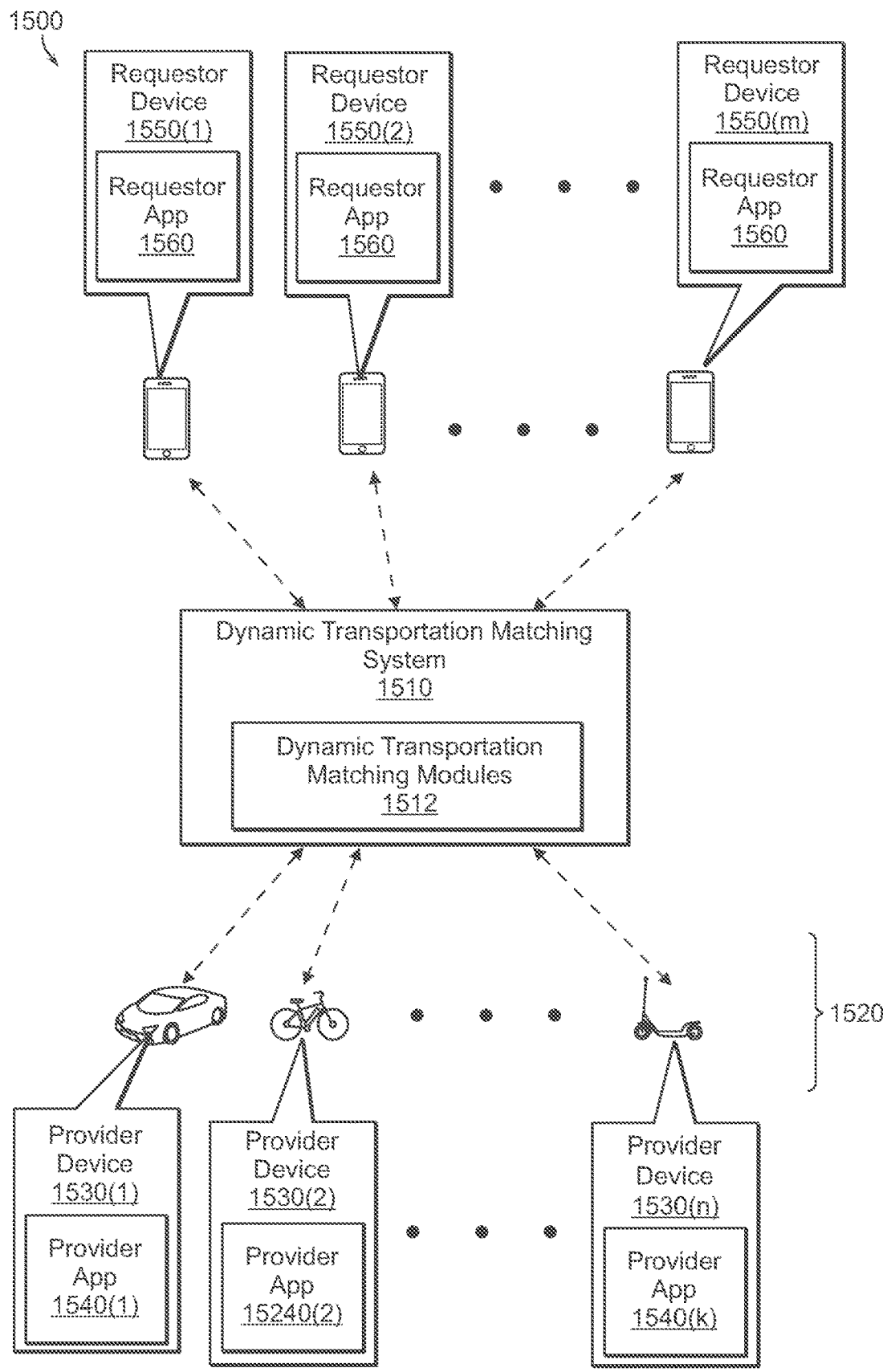
FIG. 7 illustrates an example system for matching transportation requests with a dynamic transportation network that includes personal mobility vehicles.

A micromobility vehicle as described herein may be made available through an on-demand, multimodal transportation system. FIG. 7 illustrates an example system 1500 for matching transportation requests with a dynamic transportation network that includes personal mobility vehicles. As shown in FIG. 7, a dynamic transportation matching system 1510 may be configured with one or more dynamic transportation matching modules 1512 that may perform one or more of the steps described herein. Dynamic transportation matching system 1510 may represent any computing system and/or set of computing systems capable of matching transportation requests. Dynamic transportation matching system 1510 may be in communication with computing devices in each of a group of vehicles 1520. Vehicles 1520 may represent any vehicles that may fulfill transportation requests. In some examples, vehicles 1520 may include disparate vehicle types and/or models. For example, vehicles 1520 may include road-going vehicles and personal mobility vehicles. In some examples, some of vehicles 1520 may be standard commercially available vehicles. According to some examples, some of vehicles 1520 may be owned by separate individuals (e.g., transportation providers). Furthermore, while, in some examples, many or all of vehicles 1520 may be human-operated, in some examples many of vehicles 1520 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requester, and/or an autonomous system for piloting a vehicle. While FIG. 7 does not specify the number of vehicles 1520, it may be readily appreciated that the systems described herein are applicable to hundreds of vehicles, thousands of vehicles, or more. In one example, dynamic transportation matching system 1510 may coordinate transportation matchings within a single region for 50,000 vehicles or more on a given day. In some examples, vehicles 1520 may collectively form a dynamic transportation network that may provide transportation supply on an on-demand basis to transportation requestors.

Dynamic transportation matching system 1510 may communicate with computing devices in each of vehicles 1520. The computing devices may be any suitable type of computing device. In some examples, one or more of the computing devices may be integrated into the respective vehicles 1520. In some examples, one or more of the computing devices may be mobile devices. For example, one or more of the computing devices may be smartphones. Additionally, or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requester and/or provider for a transportation matching application, a navigation application, and/or any other application suited for the use of requesters and/or providers). Additionally, or alternatively, one or more of the computing devices may be devices suitable for installing in a vehicle and/or may be a vehicle's computer that has a transportation management system application installed on the computer in order to provide transportation services to transportation requesters and/or communicate with dynamic transportation matching system 1510.

As shown in FIG. 7, vehicles 1520 may include provider devices 1530(1)-(n) (e.g., whether integrated into the vehicle, permanently affixed to the vehicle, temporarily affixed to the vehicle, worn by a driver of the vehicle, etc.). In some examples, provider devices 1530(1)-(n) may include a respective provider app 1540(1)-(k). Provider apps 1540(1)-(k) may represent any application, program, and/or module that may provide one or more services related to operating a vehicle and/or providing transportation matching services. For example, provider apps 1540(1)-(k) may include a transportation matching application for providers and/or one or more applications for matching personal mobility vehicles (PMVs) with requester devices. In some embodiments, different types of provider vehicles may be provisioned with different types of provider devices and/or different provider applications. For example, PMVs may be provisioned with provider devices that are configured with a provider application that enables transportation requesters to reserve and/or operate the PMV while road-constrained vehicles (e.g., cars) may be provisioned with provider devices that are configured with a provider application that enables provider vehicle operators (e.g., transportation providers) to respond to requests from transportation requesters. In some examples, provider applications 1540(1)-(k) may match the user of provider apps 1540(1)-(k) (e.g., a transportation provider) with transportation requesters through communication with dynamic transportation matching system 1510. In addition, and as is described in greater detail below, provider apps 1540(1)-(k) may provide dynamic transportation matching system 1510 with information about a provider (including, e.g., the current location of the provider and/or vehicle) to enable dynamic transportation matching system 1510 to provide dynamic transportation matching and/or management services for the provider and one or more requesters. In some examples, provider apps 1540(1)-(k) may coordinate communications and/or a payment between a requester and a provider. According to some embodiments, provider apps 1540(1)-(k) may provide a map service, a navigation service, a traffic notification service, and/or a geolocation service.

Additionally, as shown in FIG. 7, dynamic transportation matching system 1510 may communicate with requester devices 1550(1)-(m). In some examples, requester devices 1550(1)-(m) may include a requester app 1560. Requester app 1560 may represent any application, program, and/or module that may provide one or more services related to requesting transportation matching services. For example, requester app 1560 may include a transportation matching application for requesters. In some examples, requester app 1560 may match the user of requester app 1560 (e.g., a transportation requester) with transportation providers through communication with dynamic transportation matching system 1510. In addition, and as is described in greater detail below, requester app 1560 may provide dynamic transportation matching system 1510 with information about a requester (including, e.g., the current location of the requester) to enable dynamic transportation matching system 1510 to provide dynamic transportation matching services for the requester and one or more providers. In some examples, requester app 1560 may coordinate communications and/or a payment between a requester and a provider. According to some embodiments, requester app 1560 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requesters with one or more transportation providers. For example, a transportation matching system may provide one or more transportation matching services for a networked transportation service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requesters to ride opportunities and/or that arranges for requesters and/or providers to meet), a mapping system, a navigation system (e.g., to help a provider reach a requester, to help a requester reach a provider, and/or to help a provider reach a destination), a reputation system (e.g., to rate and/or gauge the trustworthiness of a requester and/or a provider), a payment system, and/or an autonomous or semi-autonomous driving system. The transportation matching system may be implemented on various platforms, including a requester-owned mobile device, a computing system installed in a vehicle, a requester-owned mobile device, a server computer system, or any other hardware platform capable of providing transportation matching services to one or more requesters and/or providers.

Figure 8:
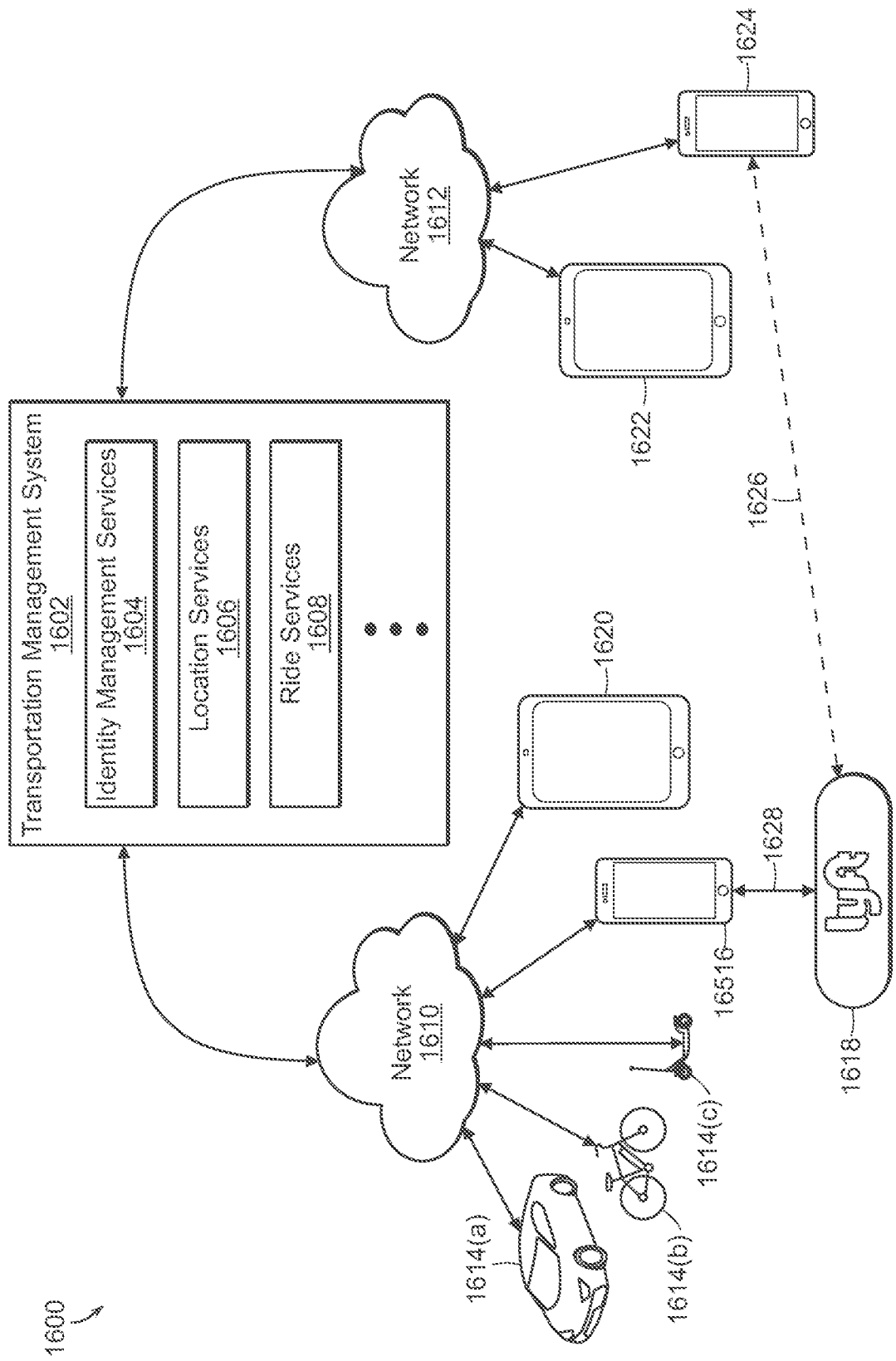
FIG. 8 shows a transportation management environment in accordance with various embodiments.

FIG. 8 shows a transportation management environment 1600, in accordance with various embodiments. As shown in FIG. 8, a transportation management system 1602 may run one or more services and/or software applications, including identity management services 1604, location services 1606, ride services 1608, and/or other services. Although FIG. 8 shows a certain number of services provided by transportation management system 1602, more or fewer services may be provided in various implementations. In addition, although FIG. 8 shows these services as being provided by transportation management system 1602, all or a portion of any of the services may be processed in a distributed fashion. For example, computations associated with a service task may be performed by a combination of transportation management system 1602 (including any number of servers, databases, etc.), one or more devices associated with a provider (e.g., devices integrated with managed vehicles 1614(*a*), 1614(*b*), and/or 1614(*c*); provider computing devices 1616 and tablets 1620; and transportation management vehicle devices 1618), and/or more or more devices associated with a ride requester (e.g., the requester's computing devices 1624 and tablets 1622). In some embodiments, transportation management system 1602 may include one or more general purpose computers, server computers, clustered computing systems, cloud-based computing systems, and/or any other computing systems or arrangements of computing systems. Transportation management system 1602 may be configured to run any or all of the services and/or software components described herein. In some embodiments, the transportation management system 1602 may include an appropriate operating system and/or various server applications, such as web servers capable of handling hypertext transport protocol (HTTP) requests, file transfer protocol (FTP) servers, database servers, etc.

In some embodiments, identity management services 1604 may be configured to perform authorization services for requesters and providers and/or manage their interactions and/or data with transportation management system 1602. This may include, e.g., authenticating the identity of providers and determining that they are authorized to provide services through transportation management system 1602. Similarly, requesters' identities may be authenticated to determine whether they are authorized to receive the requested services through transportation management system 1602. Identity management services 1604 may also manage and/or control access to provider and/or requester data maintained by transportation management system 1602, such as driving and/or ride histories, vehicle data, personal data, preferences, usage patterns as a ride provider and/or as a ride requester, profile pictures, linked third-party accounts (e.g., credentials for music and/or entertainment services, social-networking systems, calendar systems, task-management systems, etc.) and any other associated information. Transportation management system 1602 may also manage and/or control access to provider and/or requester data stored with and/or obtained from third-party systems. For example, a requester or provider may grant transportation management system 1602 access to a third-party email, calendar, or task management system (e.g., via the user's credentials). As another example, a requester or provider may grant, through a mobile device (e.g., 1616, 1620, 1622, or 1624), a transportation application associated with transportation management system 1602 access to data provided by other applications installed on the mobile device. In some examples, such data may be processed on the client and/or uploaded to transportation management system 1602 for processing.

In some embodiments, transportation management system 1602 may provide ride services 1608, which may include ride matching and/or management services to connect a requester to a provider. For example, after identity management services module 1604 has authenticated the identity a ride requester, ride services module 1608 may attempt to match the requester with one or more ride providers. In some embodiments, ride services module 1608 may identify an appropriate provider using location data obtained from location services module 1606. Ride services module 1608 may use the location data to identify providers who are geographically close to the requester (e.g., within a certain threshold distance or travel time) and/or who are otherwise a good match with the requester. Ride services module 1608 may implement matching algorithms that score providers based on, e.g., preferences of providers and requesters; vehicle features, amenities, condition, and/or status; providers' preferred general travel direction and/or route, range of travel, and/or availability; requesters' origination and destination locations, time constraints, and/or vehicle feature needs; and any other pertinent information for matching requesters with providers. In some embodiments, ride services module 1608 may use rule-based algorithms and/or machine-learning models for matching requesters and providers.

Transportation management system 1602 may communicatively connect to various devices through networks 1610 and/or 1612. Networks 1610 and 1612 may include any combination of interconnected networks configured to send and/or receive data communications using various communication protocols and transmission technologies. In some embodiments, networks 1610 and/or 1612 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1610 and/or 1612 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Bluetooth 5, Near Field Communication (NFC), Z-Wave, and ZigBee). In various embodiments, networks 1610 and/or 1612 may include any combination of networks described herein or any other type of network capable of facilitating communication across networks 1610 and/or 1612.

In some embodiments, transportation management vehicle device 1618 may include a provider communication device configured to communicate with users, such as drivers, passengers, pedestrians, and/or other users. In some embodiments, transportation management vehicle device 1618 may communicate directly with transportation management system 1602 or through another provider computing device, such as provider computing device 1616. In some embodiments, a requester computing device (e.g., device 1624) may communicate via a connection 1626 directly with transportation management vehicle device 1618 via a communication channel and/or connection, such as a peer-to-peer connection, Bluetooth connection, NFC connection, ad hoc wireless network, and/or any other communication channel or connection. Although FIG. 8 shows particular devices communicating with transportation management system 1602 over networks 1610 and 1612, in various embodiments, transportation management system 1602 may expose an interface, such as an application programming interface (API) or service provider interface (SPI) to enable various third parties which may serve as an intermediary between end users and transportation management system 1602.

In some embodiments, devices within a vehicle may be interconnected. For example, any combination of the following may be communicatively connected: vehicle 1614, provider computing device 1616, provider tablet 1620, transportation management vehicle device 1618, requester computing device 1624, requester tablet 1622, and any other device (e.g., smart watch, smart tags, etc.). For example, transportation management vehicle device 1618 may be communicatively connected to provider computing device 1616 and/or requester computing device 1624. Transportation management vehicle device 1318 may establish communicative connections, such as connections 1626 and 1628, to those devices via any suitable communication technology, including, e.g., WLAN technologies implementing the IEEE 902.12 family of standards, Bluetooth, Bluetooth Low Energy, Bluetooth 5, NFC, Z-Wave, ZigBee, and any other suitable short-range wireless communication technology.

In some embodiments, users may utilize and interface with one or more services provided by the transportation management system 1602 using applications executing on their respective computing devices (e.g., 1616, 1618, 1620, and/or a computing device integrated within vehicle 1614), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1614 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requester, including an application associated with transportation management system 1602. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 9:
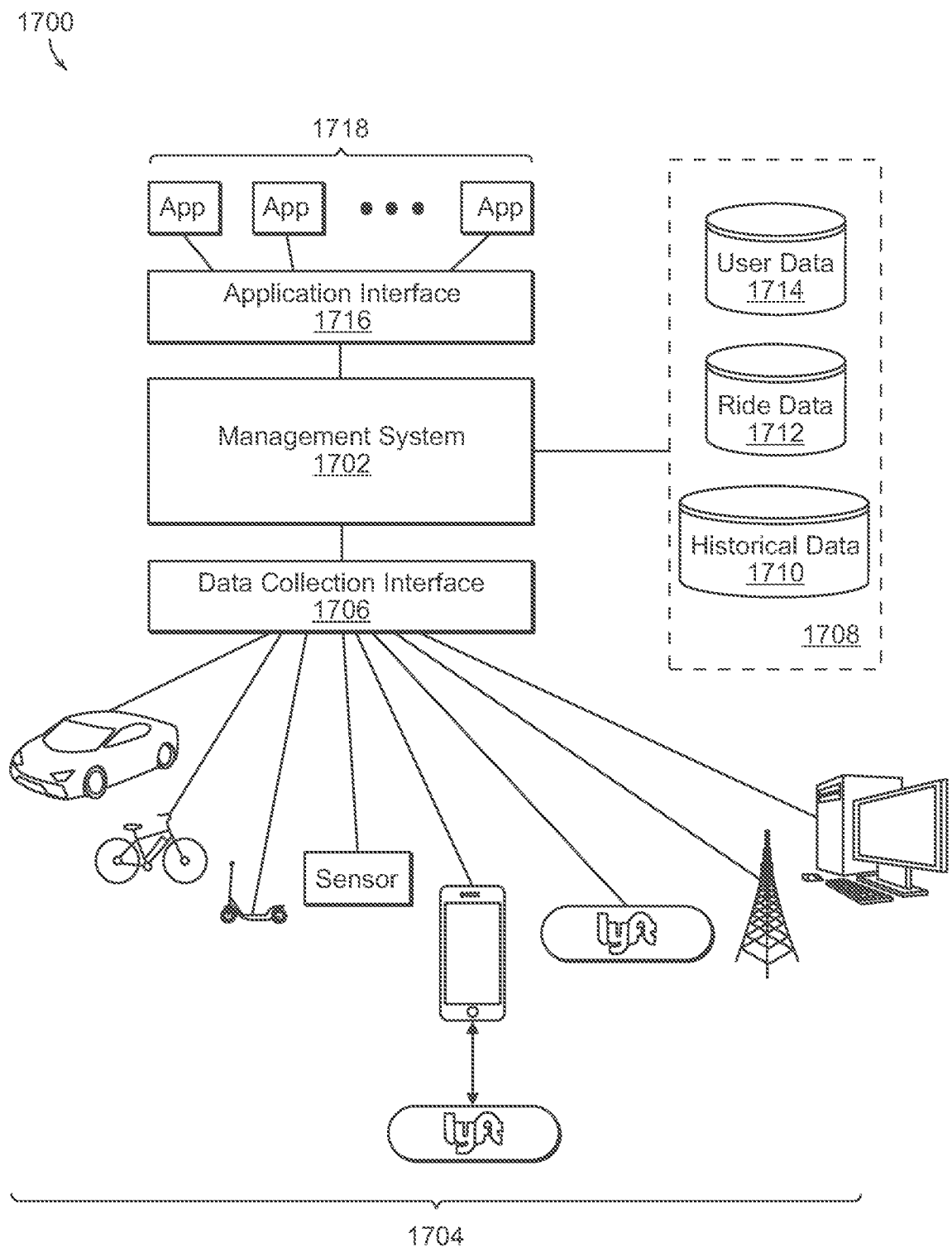
FIG. 9 shows a data collection and application management environment in accordance with various embodiments.

FIG. 9 shows a data collection and application management environment 1700, in accordance with various embodiments. As shown in FIG. 9, management system 1702 may be configured to collect data from various data collection devices 1704 through a data collection interface 1706. As discussed above, management system 1702 may include one or more computers and/or servers or any combination thereof. Data collection devices 1704 may include, but are not limited to, user devices (including provider and requester computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1706 can include, e.g., an extensible device framework configured to support interfaces for each data collection device. In various embodiments, data collection interface 1706 may be extended to support new data collection devices as they are released and/or to update existing interfaces to support changes to existing data collection devices. In various embodiments, data collection devices may communicate with data collection interface 1706 over one or more networks. The networks may include any network or communication protocol as would be recognized by one of ordinary skill in the art, including those networks discussed above.

As shown in FIG. 9, data received from data collection devices 1704 can be stored in data store 1708. Data store 1708 may include one or more data stores, such as databases, object storage systems and services, cloud-based storage services, and other data stores. For example, various data stores may be implemented on a non-transitory storage medium accessible to management system 1702, such as historical data store 1710, ride data store 1712, and user data store 1714. Data stores 1708 can be local to management system 1702, or remote and accessible over a network, such as those networks discussed above or a storage area network or other networked storage system. In various embodiments, historical data 1710 may include historical traffic data, weather data, request data, road condition data, or any other data for a given region or regions received from various data collection devices. Ride data store 1712 may include route data, request data, timing data, and other ride related data, in aggregate and/or by requester or provider. User data 1714 may include user account data, preferences, location history, and other user-specific data. Although certain data stores are shown by way of example, any data collected and/or stored according to the various embodiments described herein may be stored in data stores 1708.

As shown in FIG. 9, an application interface 1716 can be provided by management system 1702 to enable various apps 1718 to access data and/or services available through management system 1702. Apps 1718 may run on various user devices (including provider and requester computing devices, such as those discussed above) and/or may include cloud-based or other distributed apps configured to run across various devices (e.g., computers, servers, or combinations thereof). Apps 1718 may include, e.g., aggregation and/or reporting apps which may utilize data 1708 to provide various services (e.g., third-party ride request and management apps). In various embodiments, application interface 1716 can include an API and/or SPI enabling third party development of apps 1718. In some embodiments, application interface 1716 may include a web interface, enabling web-based access to data 1708 and/or services provided by management system 1702. In various embodiments, apps 1718 may run on devices configured to communicate with application interface 1716 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally, or alternatively, without limitation to transportation services, a matching system for any service may facilitate the fulfillment of requests using both human drivers and autonomous vehicles.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. A controller for an electric vehicle as described herein, for example, may be programmed to provide control functions that enable the vehicle to be used as part of a shared vehicle system. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of an electric vehicle may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the motor driving a wheel of the vehicle, receiving and processing control signals from a central server, and/or displaying information to a user. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An electric micromobility vehicle for use in a vehicle share system associated with a transportation matching system, wherein the electric micromobility vehicle is configured for seating users of different sizes, the electric micromobility vehicle comprising:
    a column;
    handlebars coupled to the column;
    a continuous frame comprising a horizontal portion and an angled portion, wherein the horizontal portion and the angled portion are joined by a bent portion of the continuous frame, and the angled portion has a terminating end that defines an end of the continuous frame;
    a footboard with a flat portion coupled to the horizontal portion of the continuous frame;
    a seat coupled to the terminating end of the angled portion of the continuous frame, the angled portion of the continuous frame making an acute angle with the flat portion of the footboard, wherein the footboard and the seat are fixed and separated by a first vertical distance, and the footboard and the handlebars are fixed and separated by a second vertical distance;
    a cargo storage location defined by (1) the footboard and the angled portion of the continuous frame and (2) the first vertical distance separating the seat and the footboard, wherein at least a portion of the cargo storage location is disposed between the seat and the footboard, wherein the footboard has a length between the column and the cargo storage location; and
    a computing device affixed to the continuous frame, wherein the computing device is capable of executing a transportation matching system application for communicatively connecting the electric micromobility vehicle to the transportation matching system for executing a ride request for a user.

2. The electric micromobility vehicle of claim 1, wherein the footboard comprises a compartment containing a battery and a motor controller.

3. The electric micromobility vehicle of claim 1, wherein the handlebars further comprise an electronic device holder including spring-loaded arms capable of applying a spring-based force for gripping an electronic device.

4. The electric micromobility vehicle of claim 3, wherein at least part of one or more of the spring-loaded arms are configured to selectively retract into the handlebars.

5. The electric micromobility vehicle of claim 3, wherein the electronic device is wirelessly coupled to the computing device of the electric micromobility vehicle, wherein the computing device receives commands from the electronic device.

6. The electric micromobility vehicle of claim 3, further comprising a display, wherein the display is configured to present a first set of information and the electronic device is configured to display a second set of information that is different from the first set of information.

7. The electric micromobility vehicle of claim 1, further comprising a provider device provided by the user or integrated with the electric micromobility vehicle and capable of executing a provider application for enabling transportation matching between a transportation requester associated with the user and the transportation matching system.

8. The electric micromobility vehicle of claim 1, wherein the bent portion of the continuous frame is a single bent portion between the footboard and the angled portion making the acute angle with the flat portion of the footboard.

9. The electric micromobility vehicle of claim 1, wherein the continuous frame is formed of a one continuous piece of material.

10. The electric micromobility vehicle of claim 1, wherein the continuous frame comprises multiple pieces of material that are rigidly joined together to prevent adjustment of the multiple pieces relative to each other.

11. An electric micromobility vehicle associated with a transportation management system, wherein the electric micromobility vehicle is configured for a user, the electric micromobility vehicle comprising:
    a continuous frame comprising a column;
    a stem coupled to the column;
    handlebars coupled to the stem;
    a footboard coupled to the continuous frame;
    a seat coupled to a terminating end of an angled portion of the continuous frame, the angled portion of the continuous frame making an acute angle with a flat portion of the footboard, wherein the footboard and the seat are fixed and separated by a first vertical distance, and the footboard and the handlebars are fixed and separated by a second vertical distance;

a cargo storage location defined by (1) the footboard and the angled portion of the continuous frame and (2) the first vertical distance between the seat and the footboard, wherein at least a portion of the cargo storage location is disposed between the seat and the footboard, wherein the footboard has a length between the column and the cargo storage location; and a computing device affixed to the continuous frame, wherein the computing device is capable of executing a transportation management system application for communicatively connecting the electric micromobility vehicle to an electronic device associated with the user.

12. The electric micromobility vehicle of claim 11, further comprising an electronic device holder coupled to the handlebars, the electronic device holder including spring-loaded arms capable of applying a spring-based force for gripping the electronic device, wherein the electronic device is wirelessly coupled to the computing device of the electric micromobility vehicle, wherein the computing device receives commands from the electronic device.

13. The electric micromobility vehicle of claim 11, further comprising a display coupled to the stem, wherein the display is configured to present a first set of information and the electronic device is configured to display a second set of information that is different from the first set of information.

14. The electric micromobility vehicle of claim 11, wherein the continuous frame is a non-adjustable frame.

15. The electric micromobility vehicle of claim 11, wherein the seat is supported by the continuous frame based on a cantilever arrangement.

* * * * *